US007091309B2

United States Patent
Brown et al.

(10) Patent No.: US 7,091,309 B2
(45) Date of Patent: Aug. 15, 2006

(54) PROCESS FOR THE MANUFACTURE OF TEMPERATURE-SENSITIVE POLYMERS

(75) Inventors: Jerry L. Brown, Heflin, AL (US); Patrick P.B. Notte, Wavre (BE)

(73) Assignee: Solutia Inc., St. Louis, MO (US)

( * ) Notice: Subject to any disclaimer, the term of this patent is extended or adjusted under 35 U.S.C. 154(b) by 104 days.

(21) Appl. No.: 10/708,026

(22) Filed: Feb. 3, 2004

(65) Prior Publication Data

US 2004/0162408 A1 Aug. 19, 2004

Related U.S. Application Data

(62) Division of application No. 10/120,009, filed on Apr. 10, 2002, now Pat. No. 6,797,193.

(60) Provisional application No. 60/283,247, filed on Apr. 11, 2001.

(51) Int. Cl.
*C09K 5/10* (2006.01)
(52) U.S. Cl. .................. 528/503; 528/497; 252/73
(58) Field of Classification Search ............ 528/308.4, 528/497, 503; 252/73; 585/1, 20, 24
See application file for complete search history.

(56) References Cited

U.S. PATENT DOCUMENTS 4,252,969 A * 2/1981 Broering et al. ............ 528/492
5,736,621 A * 4/1998 Simon et al. ............... 528/271

OTHER PUBLICATIONS

Tarmy, Reactor Technology, p. 1, Kirk-Othmer Encyclopedia of Chemical Technology, 1996, J. Wiley & Sons, Inc.; Online Posting Date: Dec. 4, 2000.*
Guest et al, Ethylene Copolymers, p. 1, Encyclopedia of Polymer Science and Technology, 2003, J. Wiley & Sons, Inc.; Online Posting Date: Apr. 15, 2003.*

* cited by examiner

*Primary Examiner*—Fred Teskin
(74) *Attorney, Agent, or Firm*—Blackwell Sanders Peper Martin LLP

(57) ABSTRACT

Process for manufacturing temperature-sensitive polymers utilizing a heat transfer fluid comprising a hydrocarbon fluid selected from aliphatic hydrocarbons, alicyclic hydrocarbons, aliphatic- or alicyclic-substituted aromatic hydrocarbons, or mixtures thereof, the hydrocarbon fluid having a boiling point from 220° C. to 250° C. and a melting point less than 40° C., and temperature-sensitive polymer articles produced therefrom.

24 Claims, No Drawings

PROCESS FOR THE MANUFACTURE OF TEMPERATURE-SENSITIVE POLYMERS

CROSS REFERENCE TO RELATED APPLICATIONS

This patent application is a divisional application of U.S. patent application Ser. No. 10/120,009, now U.S. Pat. No. 6,797,193, filed Apr. 10, 2002, currently pending, which is a nonprovisional application claiming the priority of prior provisional application serial No. 60/283,247, entitled "Process for the Manufacture of Temperature-Sensitive Polymers", filed Apr. 11, 2001, both of which are hereby incorporated by reference into this application.

FEDERAL RESEARCH STATEMENT

Not applicable

BACKGROUND OF INVENTION

The present invention relates to a process for the manufacture of temperature-sensitive polymers utilizing a heat transfer fluid comprising a hydrocarbon fluid selected from aliphatic hydrocarbons, alicyclic hydrocarbons, aliphatic- or alicyclic-substituted aromatic hydrocarbons, or mixtures thereof, the hydrocarbon fluid having a boiling point from 220° C. to 250° C. and a melting point less than 40° C. The present invention further relates to a process for manufacturing temperature-sensitive polymers utilizing a heat transfer fluid comprising a fluid selected from phenylcyclohexane (also known as cyclohexylbenzene), bicyclohexane (also known as bicyclohexyl), hydrogenated biphenyl having a level of hydrogenation between phenylcyclohexane and bicyclohexane, or mixtures thereof. The present invention further relates to plastic products made in accordance with the inventive process.

Heat transfer fluids, which can also be termed "heat carriers", are used to transfer heat energy between systems of different temperatures. Heat transfer fluids generally are eminently well-known and have been used commercially for a long time. The large majority of commercial transfer fluids, including Therminol®VP-1, (Solutia Inc.), Diphyl®DT (Bayer A.G.), Dowtherm®A (Dow Chemical) and Therm® S300 (Nippon Steel), all consist of a binary system of about 26% biphenyl and 74% diphenyloxide. Such heat transfer fluids are characterized by a boiling point of about 256° C. at atmospheric pressure and, in addition, exhibit desirable in-use properties including oxidative and thermal stability, good heat transfer properties, virtually no equipment corrosion and good economy. Irrespective of such benefits, boiling temperatures of commercial heat transfer fluids, generally above 250° C., are too high for the manufacture, including extrusion, of temperature-sensitive polymers, such as Nylon 6 and PTT (polytrimethylene terephthalate), and can lead to difficulties in the processing of the polymer and, consequently, undesirably altered in-use properties of the extruded article. In fact, a boiling point difference exceeding about 2° C. can lead to a different crystallization behavior of the polymer in the extruded article and thus yield an article exhibiting modified bulk and surface characteristics. The problem had been known for a long time and no completely satisfactory commercially-viable approaches, e.g. heat transfer fluids meeting essentially all the desired performance properties, for eliminating the difficulties have been made available up to now.

Polymer manufacturing temperatures exceeding about 245° C., can be detrimental to the quality of the extruded article made from temperature-sensitive polymers. The lowering and control of the boiling temperature of heat transfer fluids was normally achieved by applying partial vacuum. However, the use of reduced pressures requires supplementary equipment and, more importantly, selected pressures can, and normally will, vary considerably during industrial polymer manufacturing operations to thus yield deficient polymer articles. The prior art relating to the manufacture of extruded polymer articles, and the use of heat transfer fluids in such an arrangement, is well-known in the relevant technical community. U.S. Pat. No. 3,925,013 teaches the use of binary and ternary eutectic solvent mixtures for use in disperse dye carrier formulations to improve handling properties at ambient temperatures. A binary mixture of from 55–10% biphenyl and 30–45% naphthalene was found to possess a suitably lowered crystallization point so that dye carrier properties become easier. U.S. Pat. No. 5,397,491 describes heat transfer fluids, containing substituted diphenyl, exhibiting improved thermal stability at temperatures exceeding 300° C. JP-A-9145994 describes heat transfer fluids based on mixtures of alkyl naphthalenes and alkylbiphenyls, particularly combinations of diethyl biphenyl and diisopropyl naphthalene. WO 8907634 pertains to heat transfer agents consisting particularly of diphenylethers of terphenyl, biphenyldiphenyl ethers and naphthalene diphenylethers. JP-A-6968314 discloses heat transfer agents containing mixtures of biphenyl and/or naphthalene and diphenylether and terphenyl. WO 98 50483 concerns heat transfer fluids exhibiting favorable thermal stability comprising a mixture of tetrahydro(phenylethyl)naphthalene and dibenzyl toluene.

PCT Application no. PCT/EP00/12077 discloses a process for manufacture of temperature-sensitive polymers using a heat transfer fluid consisting essentially of a binary mixture of biphenyl and naphthalene in a weight ratio of 65:35 to 55:45. While this fluid is a stable and efficient heat transfer fluid with a boiling point below 245° C., it is desirable to provide a heat transfer fluid that meets more of the desired heat transfer fluid properties.

It is desirable to provide a heat transfer fluid useful for the manufacture of temperature-sensitive polymers having a lower boiling point and lower melting point than currently available heat transfer fluids, which preferably also has improved environmental, safety and health properties.

It has now been discovered that a heat transfer fluid selected from a hydrocarbon fluid selected from aliphatic hydrocarbons, alicyclic hydrocarbons, aliphatic- or alicyclic-substituted aromatic hydrocarbons, or mixtures thereof, the hydrocarbon fluid having a boiling point from 220° C. to 250° C. and a melting point less than 40° C., achieves these desired properties, and meets the demands for use in the production of temperature-sensitive polymers.

It has now been further discovered that a preferred heat transfer fluid selected from phenylcyclohexane, bicyclohexane, hydrogenated biphenyl having a level of hydrogenation between phenylcyclohexane and bicyclohexane, or mixtures thereof achieves these desired properties, and meets the demands for use in the production of temperature-sensitive polymers.

SUMMARY OF INVENTION

It is therefore a main object of this invention to provide a new stable and efficient heat transfer fluid with a boiling point between 220° C. and 250° C. It is another object of the invention to provide a process for the manufacture, with the aid of heat transfer fluid, of high quality extruded articles made from heat-sensitive polymers. It is still another object of this invention to provide a process for the manufacture of heat-sensitive polymers utilizing a heat transfer fluid having, under atmospheric conditions, a boiling point between 220° C. and 250° C., in particular in the range of from 230° C. to 245° C. Yet another object of this invention relates to providing a manufacturing arrangement for extruding temperature-sensitive polymers utilizing a heat transfer fluid at a stable temperature, i.e. subject to minimal variations, e.g. 1° C. Still another object of this invention relates to providing a processing arrangement for temperature-sensitive polymers to thus manufacture, e.g. extrude, polymer articles having uniformly stable and reproducible surface polymerization properties. The above and other objects of this invention can now be achieved by means of a process for the manufacture of temperature-sensitive polymer whereby a heat transfer fluid of the present invention is used.

According to the invention, a process for the manufacture of temperature-sensitive polymers is provided whereby a heat transfer fluid is used comprising a hydrocarbon fluid selected from aliphatic hydrocarbons, alicyclic hydrocarbons, aliphatic- or alicyclic-substituted aromatic hydrocarbons, or mixtures thereof, said hydrocarbon fluid having a boiling point from 220° C. to 250° C. and a melting point less than 40° C.

Further according to the invention, a process for the manufacture of temperature-sensitive polymers is provided whereby a heat transfer fluid is used comprising a fluid selected from phenylcyclohexane, bicyclohexane, hydrogenated biphenyl having a level of hydrogenation between phenylcyclohexane and bicyclohexane, or mixtures thereof.

Further according to the present invention, a process for manufacturing temperature-sensitive polymers is provided utilizing a heat transfer fluid, wherein the heat transfer fluid comprises a fluid produced by the catalytic hydrogenation of biphenyl at suitable temperature and pressure wherein the hydrogenation is stopped when the refractive index of the reaction mixture at 25° C. is in the range of 1.4775 to 1.544.

Still further according to the present invention, polymer articles made in accordance with the inventive process are provided.

BRIEF DESCRIPTION OF DRAWINGS

Not Applicable

DETAILED DESCRIPTION

Unless indicated to the contrary, percent and ratio indications, as used in the description and in the claims, refer to weight percent and weight ratio, respectively. The term "temperature-sensitive" or "heat-sensitive" polymers as used in the description and in the claims means polymers having a melting temperature, at ambient conditions, below 250° C., preferably in the range of from 230° C. to 248° C., more preferably 235° C. to 243° C. The term "manufacture" with respect to temperature-sensitive polymers, as used in the specification and claims, means known polymer manufacturing methods including extrusion, molding and equivalent methods. As used herein, the heat transfer fluid of the invention is a liquid and the heat transfer fluid system being used in conjunction with the manufacture of the temperature-sensitive polymers contains the heat transfer fluid as a liquid. In the process of the invention, however, it is the vaporized portion of the heat transfer fluid that is being used in conjunction with the manufacture of the temperature-sensitive polymers. Depending on the exact composition of the heat transfer fluid and the specific use conditions, this vaporized portion of the heat transfer fluid may not contain the same percentage of all components as present in the heat transfer fluid in liquid form.

A first embodiment of the invention relates to a process for the manufacture of temperature-sensitive polymers, or mixtures thereof, using a heat transfer fluid to control temperature during the manufacture, wherein the heat transfer fluid comprises a hydrocarbon fluid selected from aliphatic hydrocarbons, alicyclic hydrocarbons, aliphatic- or alicyclic-substituted aromatic hydrocarbons, or mixtures thereof, said hydrocarbon fluid having a boiling point from 220° C. to 250° C. and a melting point less than 40° C. The preferred aliphatic hydrocarbons, alicyclic hydrocarbons, and aliphatic- or alicyclic-substituted aromatic hydrocarbons of the invention have 11 to 15 carbon atoms. The more preferred hydrocarbon fluids of the invention have a melting point less than or equal to 20° C., most preferably less than or equal to 10° C.

Examples of suitable hydrocarbon fluids include, but are not limited to, phenylcyclohexane, bicyclohexane, at least one hydrogenated biphenyl having a level of hydrogenation between phenylcyclohexane and bicyclohexane, 1-ethyl-2,3,4-trimethyl benzene, 1,2,3,4-tetrahydro-1-methyl naphthalene, [2-methyl-1-(1-methylethyl)propyl]benzene, 1,2,3,4-tetrahydro-2-methyl-naphthalene, 1,2,4-trimethyl-5-(1-methylethyl)benzene, 1,2,3,4-tetrahydro-1,1-dimethylnaphthalene, heptylcyclopentane, hexylcyclohexane, 1,2,3,4-tetrahydro-1,4-dimethylnaphthalene, hexylbenzene, 1,2,3,4-tetrahydro-6-methylnaphthalene, 1,2,3,4-tetrahydro-2,2-dimethylnaphthalene, 1,2,3,4-tetrahydro-5-methylnaphthalene, 1,2,3,4-tetrahydro-1,3-dimethylnaphthalene, 2-ethyl-1,2,3,4-tetrahydronaphthalene, 1,2,3,4-tetrahydro-1,2-dimethylnaphthalene, tridecane, 1,2,3,4-tetrahydro-2,5-dimethylnaphthalene, 1,2,3,4-tetrahydro-2,8-dimethylnaphthalene, 1,2,3,4-tetrahydro-2,7-dimethylnaphthalene, 1,3,5-triisopropylbenzene, 1,2,3,4-tetrahydro-1,5-dimethylnaphthalene, heptylbenzene, 1,2,3,4-tetrahydro-2,6-dimethylnaphthalene, 1,2,3,4-tetrahydro-1,1,6-trimethylnaphthalene, 2-methylnaphthalene, octylcyclopentane, 6-ethyl-1,2,3,4-tetrahydronaphthalene, heptylcyclohexane, 1,2,4-triisopropylbenzene, 1-methylnaphthalene, 5-ethyl-1,2,3,4-tetrahydro-naphthalene, 1,2,2a,3,4,5-hexahydroacenapthylene, 1,2,4,5-tetraethylbenzene, and mixtures thereof.

The currently preferred hydrocarbon fluids of the invention are phenylcyclohexane, bicyclohexane, at least one hydrogenated biphenyl having a level of hydrogenation between phenylcyclohexane and bicyclohexane, or mixtures thereof. More preferably, the hydrocarbon fluid of the invention is phenylcyclohexane, bicyclohexane or mixtures thereof, with phenylcyclohexane and blends of phenylcyclohexane and bicyclohexane being most preferred.

A second embodiment of the invention relates to a process for the manufacture of temperature-sensitive polymers, or mixtures thereof, using a heat transfer fluid to control temperature during the manufacture, wherein the heat transfer fluid comprises a fluid selected from phenylcyclohexane, bicyclohexane, at least one hydrogenated biphenyl having a level of hydrogenation between phenylcyclohexane and bicyclohexane, or mixtures thereof.

A third embodiment of the invention relates to a process for the manufacture of temperature-sensitive polymers, or mixtures thereof, using a heat transfer fluid to control temperature during the manufacture, wherein the heat transfer fluid comprises a fluid prepared by the catalytic hydrogenation of biphenyl at suitable temperature and hydrogen pressure, wherein hydrogenation is stopped when the refractive index of the hydrogenation reaction mixture at 25° C. is in the range of 1.4775 to about 1.544, preferably 1.4775 to 1.5236.

The process(es) of the invention are particularly suitable for the manufacture of temperature-sensitive polymers that, under ambient conditions, have a melting point in the range of from 230° C. to 248° C., preferably from about 235° C. to about 243° C. Such temperature-sensitive polymers include, but are not limited to, nylon 6, nylon 11, nylon 12, polytrimethylene terephthalate, polybutene-1, polybutylene terephthalate, polyethylene terephthalate, polyolefins such as polypropylene and high-density or low-density polyethylene, and mixtures or copolymers thereof, which polymers can at temperatures starting from 250° C. and above be subject to surface and bulk polymer deficiencies as well as extrusion limitations.

Other polymers that may be advantageously processed according to the invention are poly(methylmethacrylate), polyacetal, polyionomer, EVA copolymer, cellulose acetate, hard polyvinylchloride and polystyrene or copolymers thereof. More particularly, copolymers of polyethylene terephthalate may also be advantageously used with the heat transfer fluid of the invention.

Other temperature-sensitive polymers which can be manufactured beneficially by means of the process of the invention herein can be readily selected by one of ordinary skill in the art based on routine observations of the resulting articles made by means of conventional fluids having a boiling point of about 256° C.

The heat transfer fluid is characterized, under atmospheric or slight positive pressure conditions, by a boiling point between 220° C. and 250° C., preferably between about 230° C. and about 245° C., more preferably between about 235° C. and about 243° C. The heat transfer fluids of the invention can optionally contain amounts of other basestock components, e.g. biphenyl, diphenyl oxide or a biphenyl/naphthalene mixture, as long as the required fluid properties are achieved. The heat transfer fluids of the invention can also optionally contain additive levels of known compounds that are used for their known functionality in art-established levels.

As an example of such compounds, anti-oxidants in levels usually below 100 ppm can be added to the heat transfer fluid to thus augment the oxidative stability of the fluid.

In the embodiments of the invention wherein the heat transfer fluid comprises a fluid selected from phenylcyclohexane, bicyclohexane, at least one hydrogenated biphenyl having a level of hydrogenation between phenylcyclohexane and bicyclohexane, or mixtures thereof, the heat transfer fluids used in the processes of the present invention are produced by the catalytic hydrogenation of biphenyl. The hydrogenation can be conducted using any suitable hydrogenation catalyst known to those of ordinary skill in the art. The currently preferred hydrogenation catalyst is Raney nickel used at a concentration of about 1 to about 3.5 percent based on the biphenyl charged to the reaction. Suitable temperature and hydrogen pressure are those readily known to those of ordinary skill in the art. Exemplary temperatures for use in the catalytic hydrogenation are about 140° C. to about 220° C. Exemplary hydrogen pressure for use in the catalytic hydrogenation is between about 200 psig and about 500 psig. The hydrogenation endpoint is critical in determining the composition of the heat transfer fluid produced.

It is convenient to use refractive index as the measure of when the hydrogenation process is to be stopped. Refractive index is measured at 25° C. using ASTM D1218 or equivalent. If phenylcyclohexane ("PCH") is the desired product, i.e. only one aryl ring is completely saturated, the hydrogenation must be stopped at a refractive index of 1.523 to 1.5236. It should be noted that once hydrogenation is started, one ring will be completely saturated before hydrogenation of the second ring begins. If bicyclohexane is the desired product, i.e. both aryl rings are completely saturated, hydrogenation is continued as long as hydrogen will react or until a refractive index (at 25° C.) of 1.4775 is achieved. If a hydrogenated biphenyl having a level of hydrogenation between phenylcyclohexane and bicyclohexane is desired, hydrogenation is stopped when the refractive index is greater than 1.4775 and less than 1.523. If the heat transfer fluid contains an amount of biphenyl that has not been hydrogenated but less than the amount which would adversely effect the final fluid properties, e.g. up to about 25% biphenyl, the refractive index of the hydrogenation reaction mixture will be less than about 1.544.

The preferred heat transfer fluids of the present invention have improved environmental, safety and health properties. For example, the preferred fluids of the invention are not on the reportable quantity (RQ) lists of CERCLA or RCRA. In addition, the preferred fluids of the invention are not listed as hazardous air pollutants (HAP) by the Clean Air Act.

The currently preferred heat transfer fluids of the invention are phenylcyclohexane, bicyclohexane, at least one hydrogenated biphenyl having a level of hydrogenation between phenylcyclohexane and bicyclohexane, or mixtures thereof. More preferably, the hydrocarbon fluid of the invention is phenylcyclohexane, bicyclohexane or mixtures thereof, with phenylcyclohexane or blends of phenylcyclohexane and bicyclohexane being most preferred.

A fourth embodiment is an article produced by the process (es) of the first, second or third embodiments.

A fifth embodiment is a heat transfer fluid comprising a mixture of phenylcyclohexane and bicyclohexane wherein the weight ratio of phenylcyclohexane to bicyclohexane is about 1:99 to about 99:1, preferably about 50:50 to about 99:1, more preferably about 70:30 to about 99:1, and most preferably about 90:10 to about 99:1.

EXAMPLES

Not Applicable.

The invention claimed is:

1. A process for the manufacture of temperature-sensitive polymers, or mixtures thereof, using a heat transfer fluid to control temperature during said manufacture, wherein said heat transfer fluid comprises a hydrocarbon fluid selected from aliphatic hydrocarbons, alicyclic hydrocarbons, aliphatic- or alicyclic-substituted aromatic hydrocarbons, or mixtures thereof, said hydrocarbon fluid having a boiling point from 220° C. to 250° C. and a melting point less than 40° C.

2. The process of claim 1 wherein said hydrocarbon fluid has a melting point less than or equal to 20° C.

3. The process of claim 1 wherein said heat transfer fluid further comprises biphenyl, diphenyl oxide or a biphenyl/naphthalene mixture, provided the heat transfer fluid has a boiling point from 220° C. to 250° C. and a melting point less than 40° C.

4. The process of claim 1 wherein said heat transfer fluid comprises a fluid selected from phenylcyclohexane, bicyclohexane, at least one hydrogenated biphenyl having a level of hydrogenation between phenylcyclohexane and bicyclohexane, or mixtures thereof.

5. The process of claim 4 wherein said heat transfer fluid is selected from the group consisting of phenylcyclohexane, bicyclohexane and mixtures thereof.

6. The process of claim 5 wherein said heat transfer fluid is bicyclohexane.

7. The process of claim 5 wherein said heat transfer fluid is phenylcyclohexane.

8. The process of claim 5 wherein said heat transfer fluid is a mixture of phenylcyclohexane and bicyclohexane.

9. The process of claim 4 wherein said heat transfer fluid further comprises biphenyl, diphenyl oxide or a biphenyl/naphthalene mixture, provided the heat transfer fluid has a boiling point from 220° C. to 250° C. and a melting point less than 40° C.

10. The process of claim 1 wherein the temperature-sensitive polymer has, under ambient conditions, a melting point in the range of from 230° C. to 248° C. and wherein the boiling point of said heat transfer fluid is, under ambient conditions, about 230° C. to about 245° C.

11. The process of claim 10 wherein the boiling point of said heat transfer fluid is in the range of from about 235° C. to about 243° C.

12. The process of claim 1 wherein said temperature-sensitive polymer is selected from the group consisting of nylon 6, nylon 11, nylon 12, polytrimethylene terephthalate, polybutene-1, polybutylene terephthalate, polyethylene terephthalate, polypropylene, and high-density or low-density polyethylene, said polymer having a melting point, under ambient conditions, in the range of from about 230° C. to about 248° C.

13. The process of claim 1 wherein said temperature-sensitive polymer is polyethylene terephthalate or a copolymer thereof.

14. The process of claim 1 wherein said temperature-sensitive polymer is selected from the group consisting of poly(methylmethacrylate), a polyacetal, a polyionomer, an EVA copolymer, cellulose acetate, hard polyvinylchloride and polystyrene.

15. A process for the manufacture of temperature-sensitive polymers, or mixtures thereof, using a heat transfer fluid to control temperature during said manufacture, wherein said heat transfer fluid comprises a fluid prepared by the catalytic hydrogenation of biphenyl at suitable temperature and hydrogen pressure, wherein hydrogenation is stopped when the refractive index of the hydrogenation reaction mixture at 25° C. is in the range of 1.4775 to 1.544.

16. The process of claim 15 wherein the refractive index of said heat transfer fluid is 1.4775 to 1.5236.

17. The process of claim 15 wherein the refractive index of said heat transfer fluid is 1.4775.

18. The process of claim 15 wherein the refractive index of said heat transfer fluid is 1.523 to 1.5236.

19. The process of claim 15 wherein said heat transfer fluid further comprises biphenyl, diphenyl oxide or a biphenyl/naphthalene mixture, provided the heat transfer fluid has a boiling point from 220° C. to 250° C. and a melting point less than 40° C.

20. The process of claim 15 wherein the temperature-sensitive polymer has, under ambient conditions, a melting point in the range of from 230° C. to 248° C. and wherein the boiling point of said heat transfer fluid is, under ambient conditions, about 230° C. to about 245° C.

21. The process of claim 20 wherein said temperature-sensitive polymer has a melting point in the range of from about 235° C. to about 243° C.

22. The process of claim 15 wherein said temperature-sensitive polymer is selected from the group consisting of nylon 6, nylon 11, nylon 12, polytrimethylene terephthalate, polybutene-1, polybutylene terephthalate, polyethylene terephthalate, polypropylene, and high-density or low-density polyethylene, said polymer having a melting point, under ambient conditions, in the range of from about 230° C. to about 248° C.

23. The process of claim 15 wherein said temperature-sensitive polymer is polyethylene terephthalate or a copolymer thereof.

24. The process of claim 15 wherein said temperature-sensitive polymer is selected from the group consisting of poly(methylmethacrylate), a polyacetal, a polyionomer, an EVA copolymer, cellulose acetate, hard polyvinylchloride and polystyrene.

* * * * *

UNITED STATES PATENT AND TRADEMARK OFFICE
CERTIFICATE OF CORRECTION

PATENT NO. : 7,091,309 B2 Page 1 of 1
APPLICATION NO. : 10/708026
DATED : August 15, 2006
INVENTOR(S) : Brown et al.

It is certified that error appears in the above-identified patent and that said Letters Patent is hereby corrected as shown below:

On the title page

Item [*] Notice: Subject to any disclaimer, the term of this patent is extended or adjusted under 35 USC 154(b) by (104) days Delete the phrase "by 104 days" and insert -- by 195 days --

Signed and Sealed this

Twelfth Day of February, 2008

JON W. DUDAS
*Director of the United States Patent and Trademark Office*